(12) United States Patent
Jackson

(10) Patent No.: US 9,652,240 B2
(45) Date of Patent: *May 16, 2017

(54) STACK POINTER VALUE PREDICTION

(71) Applicant: Imagination Technologies Limited, Kings Langley (GB)

(72) Inventor: Hugh Jackson, Sydney (AU)

(73) Assignee: Imagination Technologies Limited, Kings Langley (GB)

( * ) Notice: Subject to any disclaimer, the term of this patent is extended or adjusted under 35 U.S.C. 154(b) by 114 days.

This patent is subject to a terminal disclaimer.

(21) Appl. No.: 14/596,407

(22) Filed: Jan. 14, 2015

(65) Prior Publication Data
US 2015/0205611 A1 Jul. 23, 2015

(30) Foreign Application Priority Data
Jan. 17, 2014 (GB) .................................. 1400806.4

(51) Int. Cl.
*G06F 9/44* (2006.01)
*G06F 9/312* (2006.01)
*G06F 12/02* (2006.01)
*G06F 9/30* (2006.01)
(Continued)

(52) U.S. Cl.
CPC ...... *G06F 9/30181* (2013.01); *G06F 9/30101* (2013.01); *G06F 9/30134* (2013.01); *G06F 9/384* (2013.01); *G06F 9/3832* (2013.01); *G06F 9/4425* (2013.01); *G06F 12/0875* (2013.01); *G06F 2212/451* (2013.01)

(58) Field of Classification Search
CPC ............. G06F 9/30181; G06F 9/30101; G06F 9/30134; G06F 9/3832; G06F 9/384; G06F 9/4425; G06F 12/0875; G06F 2212/451
See application file for complete search history.

(56) References Cited

U.S. PATENT DOCUMENTS

| 5,687,336 A * | 11/1997 | Shen ........................ G06F 9/34 712/202 |
| 6,578,094 B1 * | 6/2003 | Moudgill ................ G06F 7/785 710/40 |
| 7,870,542 B1 | 1/2011 | Ramananda |

(Continued)

OTHER PUBLICATIONS

Collins J. et al, "Pointer cache assisted prefetching", Proc. 35th Annual IEEE/ACM International Symposium on Microarchitecture Nov. 18-22, 2002, pp. 62-73.

*Primary Examiner* — Daniel Pan
(74) *Attorney, Agent, or Firm* — Vorys, Sater, Seymour and Pease LLP; Vincent M DeLuca

(57) ABSTRACT

Methods and apparatus for predicting the value of a stack pointer which store data when an instruction is seen which grows the stack. The information which is stored includes a size parameter which indicates by how much the stack is grown and one or both of: the register ID currently holding the stack pointer value or the current stack pointer value. When a subsequent instruction shrinking the stack is seen, the stored data is searched for one or more entries which has a corresponding size parameter. If such an entry is identified, the other information stored in that entry is used to predict the value of the stack pointer instead of using the instruction to calculate the new stack pointer value. Where register renaming is used, the information in the entry is used to remap the stack pointer to a different physical register.

20 Claims, 11 Drawing Sheets

(51) Int. Cl.
 *G06F 9/38* (2006.01)
 *G06F 12/0875* (2016.01)

(56) References Cited

U.S. PATENT DOCUMENTS

| | | |
|---|---|---|
| 2003/0018879 A1 | 1/2003 | Sahraoui et al. |
| 2003/0161172 A1 | 8/2003 | Civlin |
| 2004/0162947 A1* | 8/2004 | Hooker ................ G06F 9/3004 711/132 |
| 2004/0205409 A1 | 10/2004 | Wu et al. |
| 2008/0235491 A1* | 9/2008 | Svec ................... G06F 9/30101 712/23 |
| 2015/0205612 A1* | 7/2015 | Jackson .............. G06F 9/30138 712/216 |

* cited by examiner

STACK POINTER VALUE PREDICTION

BACKGROUND

Out-of-order microprocessors can provide improved computational performance by executing instructions in a sequence that is different from the order in the program, so that instructions are executed when their input data is available rather than waiting for the preceding instruction in the program to execute. In order to allow instructions to run out-of-order on a microprocessor it is useful to be able to rename registers used by the instructions. This enables the removal of "write-after-read" (WAR) dependencies from the instructions as these are not true dependencies. By using register renaming and removing these dependencies, more instructions can be executed out of program sequence, and performance is further improved. Register renaming is performed by maintaining a map of which registers named in the instructions (called architectural registers) are mapped onto the physical registers of the microprocessor. However, parallelism is still limited by true dependencies in the program, such as one instruction reading the result of the previous instruction.

A potential solution to this involves predicting the outcome of an instruction, such that future instructions can issue using the predicted value rather than waiting for the actual result. This breaks a true dependence, but if a prediction is incorrect, the effects of that prediction must be flushed or "rewound."

The embodiments described below are not limited to implementations which solve any or all of the disadvantages of known methods of value prediction.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods and apparatus for predicting the value of a stack pointer are described. In an embodiment, data is stored when an instruction is seen which grows the stack. The information which is stored includes a size parameter which indicates by how much the stack is grown and one or both of: the register ID currently holding the stack pointer value or the current stack pointer value. When a subsequent instruction shrinking the stack is seen, the stored data is searched for one or more entries which has a corresponding size parameter. If such an entry is identified, the other information stored in that entry is used to predict the value of the stack pointer instead of using the instruction to calculate the new stack pointer value. Where register renaming is used, the information in the entry is used to remap the stack pointer to a different physical register.

A first aspect provides a method of predicting stack pointer values for a stack in a processor, the stack having an associated stack pointer and the method comprising: in response to detection of an instruction growing the stack, storing, in a data structure, a data entry comprising a size value corresponding to an amount by which the instruction grows the stack and at least one of: a register ID of a physical register storing a value of the stack pointer prior to the instruction growing the stack; and the value of the stack pointer prior to the instruction growing the stack; and in response to subsequent detection of an instruction shrinking the stack, comparing a size value corresponding to an amount by which the instruction shrinks the stack to one or more stored size values in the data structure; in response to detecting a correspondence between the size value corresponding to an amount by which the instruction shrinks the stack and one or more stored size values, updating the stack pointer based on data entries comprising the one or more stored size values used in the comparison and removing from the data structure the data entries comprising the one or more stored size values used in the comparison; and in response to failing to detect a correspondence between the size value corresponding to an amount by which the instruction shrinks the stack and one or more stored size values, removing all entries from the data structure.

A second aspect provides a processor comprising: memory arranged to store a stack, the stack having an associated stack pointer; and a stack pointer value prediction module; and memory arranged to store a data structure, wherein the stack pointer value prediction module is arranged: in response to detection of an instruction growing the stack, to store, in the data structure, a data entry comprising a size value corresponding to an amount by which the instruction grows the stack and at least one of: a register ID of a physical register storing a value of the stack pointer prior to the instruction growing the stack; and the value of the stack pointer prior to the instruction growing the stack; and in response to subsequent detection of an instruction shrinking the stack, to compare a size value corresponding to an amount by which the instruction shrinks the stack to one or more stored size values in the data structure; in response to detecting a correspondence between the size value corresponding to an amount by which the instruction shrinks the stack and one or more stored size values, to update the stack pointer based on data entries comprising the one or more stored size values used in the comparison and removing from the data structure the data entries comprising the one or more stored size values used in the comparison; and in response to failing to detect a correspondence between the size value corresponding to an amount by which the instruction shrinks the stack and one or more stored size values, to remove all entries from the data structure.

A third aspect provides method of predicting stack pointer values for a stack in a processor, the stack having an associated stack pointer and the method comprising, in a load-store unit in the processor: detecting a change in a stack pointer; in response to detecting a change in the stack pointer, storing a register ID of a physical register storing a value of the stack pointer prior to the change and the value of the stack pointer prior to the change; and in response to receiving an instruction to load/store using a physical register corresponding to a stored register ID, calculating an address for the load/store using the stored value of the stack pointer associated with the stored register ID.

Further aspects provide a computer readable medium comprising computer program code to configure a computer to perform a method as described herein, a computer readable storage medium having encoded thereon computer readable program code for generating a processor configured to perform a method as described herein, a computer readable storage medium having encoded thereon computer readable program code for generating a processor as described herein, a processor substantially as described with reference to FIG. 4 of the drawings, a method of operating a processor substantially as described with reference to any of FIGS. 1, 8, 9 and 11 of the drawings and a method of operating a load-store unit in a processor substantially as described with reference to FIG. 5 of the drawings.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
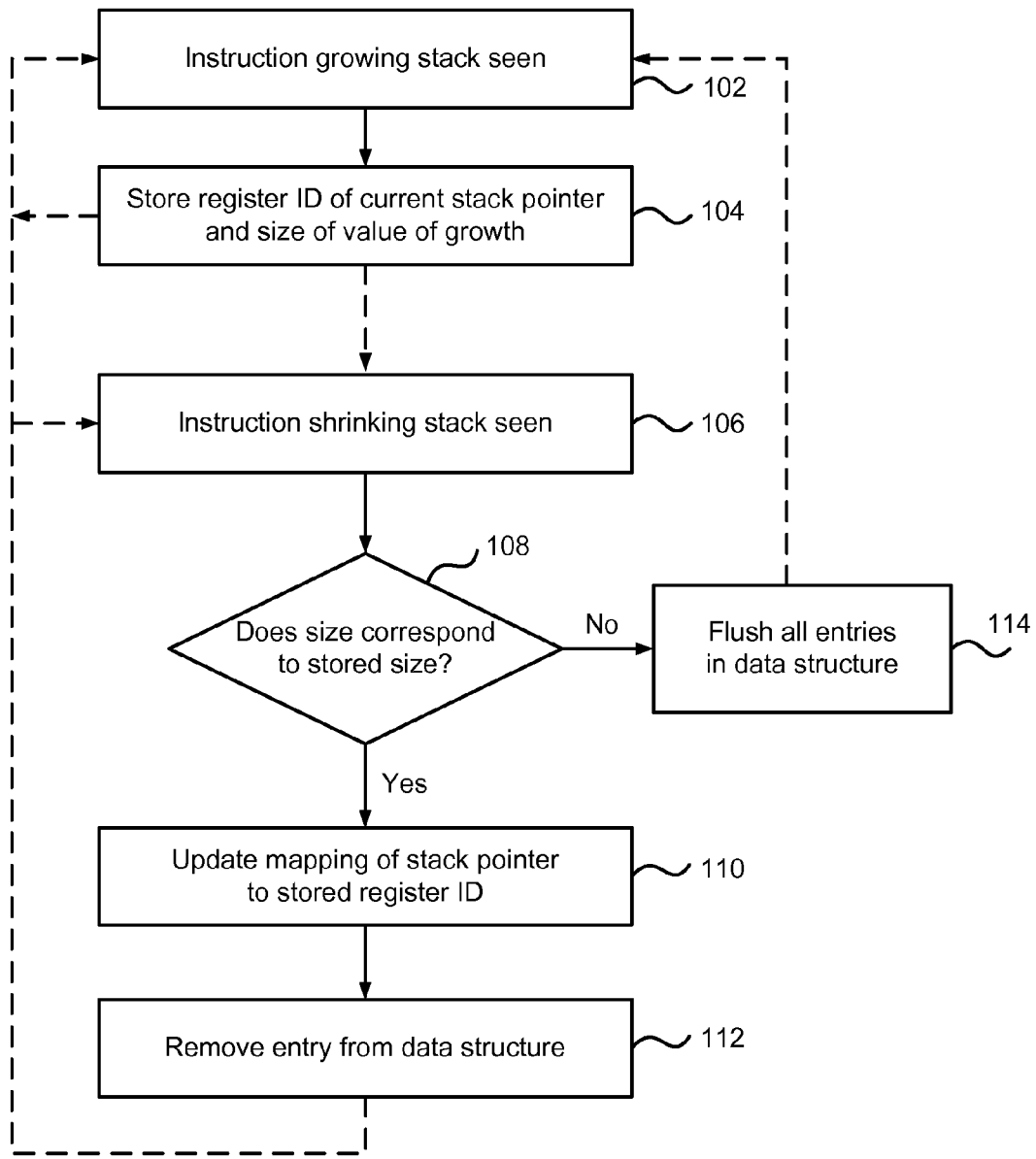
FIG. 1 is a flow diagram of an example method of stack pointer value prediction.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

The stack is a data structure which is typically used to provide a region of temporary storage for use by a program and is implemented as a last-in first-out (LIFO) data structure (which may alternatively be referred to as a first-in last-out FILO data structure) such that data is removed from the stack strictly in the reverse order to which it was added to the stack. The stack may be considered to grow up or down from a stack origin; however, in either case, the top of the stack, which is the most recently added element on the stack, is identified by a stack pointer which typically points to the next non-used entry. The value of the stack pointer may be stored in a hardware register within a processor. When a data element is added (or "pushed") to the stack it is written to the location pointed to by the stack pointer and the value of the stack pointer is updated (so that it points to the next non-used entry), e.g. by incrementing the pointer by 4 (i.e. 4 bytes=32 bits). When a data element is subsequently removed (or "popped") from the stack, the data element is removed and the stack pointer is updated to point to the next non-used entry on the shorter stack, e.g. by decrementing the pointer by 4.

For the purposes of the following description, a stack is considered to grow down such that the value of the stack pointer decreases when data is pushed to the stack and increases when data is popped from the stack. It will be appreciated, however, that the methods described herein are equally applicable whether a stack is considered to grow up (where the value of the stack pointer increases when data is pushed to the stack and decreases when data is popped from the stack) or to grow down.

Described below is a method of predicting the value of a stack pointer which is designed such that it does not make incorrect predictions. The method, which stores previous stack pointer register IDs, is arranged to either make a correct prediction or to make no prediction at all. This eliminates the possibility of having to subsequently flush the effects of a prediction when that prediction is found to be incorrect. The method uses a new data structure in which the physical register assignments for a stack pointer (where register renaming is used) are stored each time the stack pointer is updated. When the stack pointer is updated, the identifier (ID) of the physical register which held the value of the stack pointer prior to the update is stored along with a size value of the growth of the stack (which is equivalent to the change in the stack pointer). The new stack pointer value (following the update) is stored in a different physical register. If the stack grows by a particular amount (e.g. upon entering a function) and then subsequently shrinks by the same amount (e.g. upon exiting the same function), the mapping of the stack pointer can be updated to the previously stored physical register ID. This saves an ALU (arithmetic logic unit) operation as the new stack pointer value does not need to be calculated (the new, post-stack-shrinkage value is already stored in the physical register corresponding to the stored register ID).

The methods described herein may be particularly useful, and result in considerable efficiencies, where a main function calls many other smaller functions and hence many ALU operations may be saved; however, the methods are not restricted to use in only such situations.

Although the methods are described with reference to stack pointers and in particular in processors which use register renaming, the methods described herein are also applicable where register renaming is not used and for any reversible function, as described in more detail below.

Figure 2:
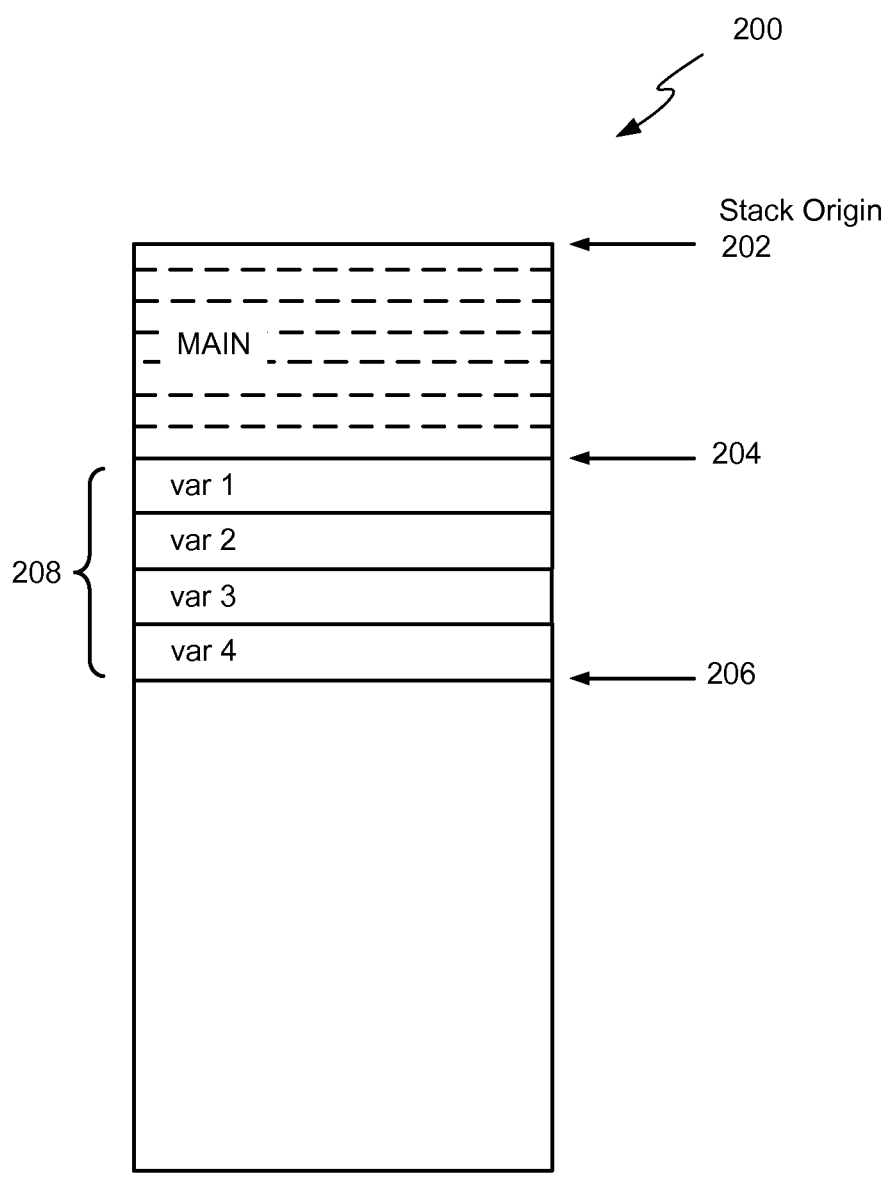
FIG. 2 is a schematic diagram showing an example stack.

FIG. 1 shows a flow diagram of an example method of stack pointer value prediction which can be described with reference to FIG. 2 which is a schematic diagram of a stack 200. As shown in FIG. 2, the stack 200 has an origin 202 and for the purposes of the description is considered to grow down from this stack origin 202.

When an instruction growing the stack is seen (block 102), the register ID for the physical register currently holding the stack pointer value (prior to the growing of the stack) is stored along with a size value of the growth of the stack (block 104). The register ID and size value may be stored (block 104) in a new data structure which may be arranged to hold N pairs of values (where N is a design choice). This data structure may also take the form of a stack (i.e. a LIFO or FILO data structure) with entries being removed strictly in the reverse order to which they were added to the stack and may be referred to herein as the 'prediction stack' to differentiate it from the main stack (e.g. as shown in FIG. 2) to which the instructions seen in blocks 102 and 106 of FIG. 1 refer.

In an example, the instruction growing the stack (as seen in block 102) may be the result of a function call (i.e. entering a function) and the instruction may, for example, take the form:

SUB P8 P2 16 where P8 is the ID of the new physical register assigned to the stack pointer value and where the new stack pointer value is to be stored, P2 is the ID of the physical register currently assigned to the stack pointer (and so holding the stack pointer value prior to this addition of data to the stack) and 16 is the increase in the size of the stack.

Referring to the example stack 200 shown in FIG. 2, physical register P2 holds the stack pointer value corresponding to arrow 204 and physical register P8 is where the new value of the stack pointer corresponding to arrow 206 is stored, which enables the data (in this example, four variables 208 each 32 bits wide) to be added to the stack 200.

If the data structure (or prediction stack) was originally empty, following the example instruction above, the contents of the data structure may be:

| P2 | 4 |
|----|---|
|    |   |
|    |   |
|    |   | where the first column contains the register ID and the second column contains the size value (in bytes). Although the data structure could store a size value of 16 (which corresponds exactly to the size value in the instruction growing the stack, as in this example data is 32 bits wide (4 bytes), the size value in instructions will always be a multiple of 4 (and hence a subset of the bits in the size value will be constant and do not need to be stored). In this example, N=4 as there is space for four entries in the data structure. It will be appreciated that this size and format of the data structure is provided by way of example only and in other examples the data structure may be arranged differently whilst still holding the same data pairs (register ID and size value).

The amount of storage (e.g. memory or flip-flops) required for the data structure depends on the value of N and the numbers of bits required to store both the register ID (e.g. 4 or 6 bits) and the size value (e.g. 4 or 6 bits). In some examples N=1, leading to a data structure which only requires a very small amount of storage. In other examples however, N>1, for example to allow for nested functions, as described below.

Subsequent to seeing the instruction growing the stack (in block 102), an instruction shrinking the stack may be seen (block 106), which may, for example, be the result of returning from a function (i.e. exiting a function). The instruction may, for example, take the form:

ADD P9 P8 16 where P9 is the ID of the new physical register assigned to the stack pointer value and where the new stack pointer value is to be stored, P8 is the ID of the physical register currently assigned to the stack pointer (and so holding the stack pointer value prior to this removal of data from the stack) and 16 is the decrease in the size of the stack.

In response to detecting an instruction shrinking the stack (in block 106), the size value in this instruction is compared to the size value(s) stored in the data structure (block 108). For the purposes of the current explanation, the size value in the instruction is compared to the size value in the top entry in the data structure (i.e. the most recently added entry in the data structure).

Referring back to the example data structure shown above, it can be seen that in this example the size values do correspond ('Yes' in block 108) as the stored value 4 corresponds to a change in stack size of 16 (as, for reasons described above, the value stored in the data structure in this example is given by the change in stack size divided by 4). In response to detecting the correspondence or match ('Yes' in block 108), the register renaming table is updated to show that the new physical register assigned to the stack pointer value corresponds to the stored register ID (block 110), e.g. P2 in the example above, and the physical register identified in the instruction shrinking the stack (P9 in the example above) is not used. It is consequently not necessary to perform the calculation to compute the new value of the stack pointer (as it is already stored in the physical register identified in the data structure, e.g. P2 in the example above) which saves an ALU operation and breaks RAW hazards (which allows greater out-of-order execution). Additionally the physical register identified in the instruction shrinking the stack (e.g. P9 in the example above) can be used for another purpose (e.g. it may remain on a free register list, where such a list is maintained). The entry from the data structure containing the corresponding size value is removed from the data structure (block 112), which in the example above leaves the data structure empty.

In the example above, the instruction shrinking the stack (which was identified in block 106) comprised a size value which corresponded to the top entry in the data structure ('Yes' in block 108). If, however, the instruction shrinking the stack was, for example:

ADD P9 P8 24 then the size values do not correspond ('No' in block 108 as 24/4=6 and 6≠4). Where there is no correspondence, all the entries in the data structure are flushed (so that the data structure is empty) and the instruction shrinking the stack is executed in the normal way.

As can be seen from the description above, the comparison which is performed between the entries in the data structure and the instruction shrinking the stack ensures that a prediction is only made where it will be correct (i.e. where the size values correspond) and that no prediction of the stack pointer value is made in other situations (i.e. where the size values do not correspond).

In the example which has just been described the instruction shrinking the stack is compared to the top entry in the data structure, however in other examples described below, the comparison may also involve other entries in the data structure.

In various examples, low level control of the physical registers may be used to ensure that the original physical registers (which are referenced in the prediction stack) are not invalidated whilst they are referenced in the prediction stack. One example method would be to pass some sideband with the stack-growing instruction so that the logic later that releases/invalidates physical registers does not release/invalidate the physical register holding the stack pointer which is referenced in the prediction stack. In another example, method, the logic which maintains the prediction stack (e.g. the stack pointer value prediction module 420 shown in FIG. 4) signals which registers are in use so that the releasing/invalidating logic does not release/invalidate them. Once the entries containing the particular register ID are flushed from the prediction stack, the physical registers can be invalidated/reused, etc.

As physical registers that are referenced in the prediction stack are not invalidated, additional physical registers may be required, with the minimum number of physical registers corresponding to one more than the sum of the number of architectural registers, the maximum number of physical registers that can be referenced in the prediction stack (which is equal to N). Typically, however, a processor may have many more physical registers than this minimum.

In the example described above, the instruction shrinking the stack (seen in block 106) followed the instruction growing the stack (seen in block 102) without other data being added to and/or removed from the stack in between. In some examples, however, such as for nested functions, data may be added to the stack more than once before any of the data is removed from the stack and this can be described in another example which can be described with reference to FIG. 3.

In this example, a first instruction growing the stack is seen (in block 102):

SUB P8 P2 16

And so, as described above, the register ID storing the current stack pointer (P2) is stored in the data structure (block 104) along with the size value (16/4=4):

| P2 | 4 |
|----|---|
|    |   |
|    |   |
|    |   |

Figure 3:
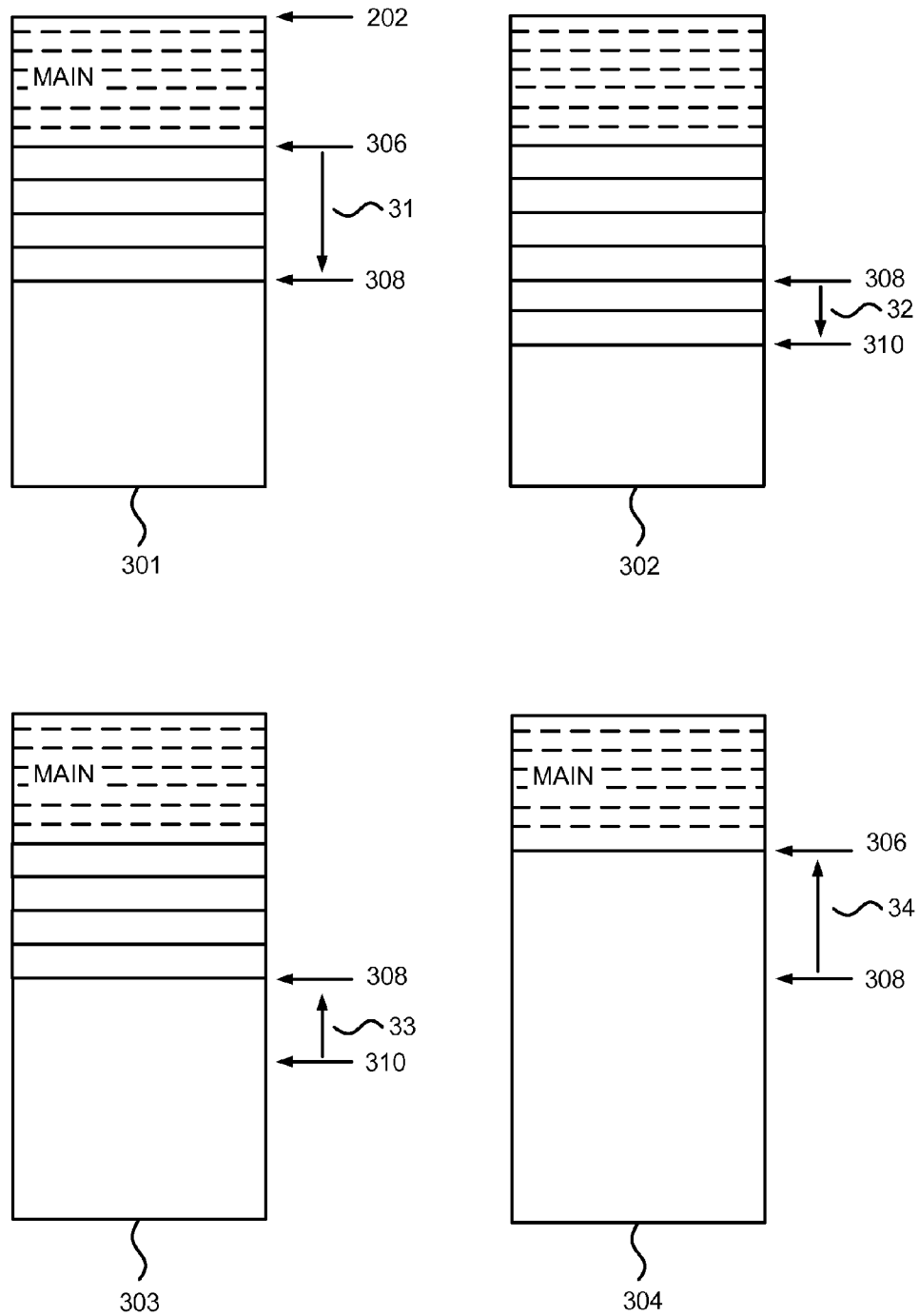
FIG. 3 shows schematic diagrams of the growth and shrinking of an example stack.

As shown in the first example stack 301 in FIG. 3, four data items are added to the stack (as indicated by arrow 31) and the stack pointer is updated from the original value corresponding to arrow 306 (as stored in physical register P2) to a new value corresponding to arrow 308, which is stored in physical register P8.

The next instruction which is seen which manipulates (i.e. grows or shrinks) the stack may, for example, be another instruction which grows the stack (as seen in block 102), as indicated by the dotted arrow from block 104 to block 102 in FIG. 1. In this example, this second instruction which grows the stack may be:

SUB P4 P8 8

And so, as described above, the register ID of the current stack pointer (P8) is stored in the data structure (block 104) along with the size value (8/4=2):

| P2 | 4 |
|----|---|
| P8 | 2 |
|    |   |
|    |   |

This new entry is now considered the top entry in the data structure. As shown in the second example stack 302 in FIG. 3, two data items are added to the stack (as indicated by arrow 32) and the stack pointer is updated from the value corresponding to arrow 308 (as stored in physical register P8) to a new value corresponding to arrow 310, which is stored in physical register P4.

Subsequently an instruction shrinking the stack may be seen (in block 106):

ADD P3 P4 8

This size value (8) in this instruction is compared (in block 108) to the size value in the top entry in the data structure and it can be seen from this example that there is a correspondence ('Yes' in block 108 as 8/4=2 and 2=2). Consequently the mapping of the physical register storing the stack pointer is updated (in block 110) to the register ID in the top entry in the data structure (P8) and the top entry is removed from the data structure (in block 112) leaving:

| P2 | 4 |
|----|---|
|    |   |
|    |   |
|    |   |

As shown in the third example stack 303 in FIG. 3, two data items are removed from the stack (as indicated by arrow 33) and the stack pointer is updated from the value corresponding to arrow 310 as stored in physical register P4 to the value corresponding to arrow 308 which was stored earlier in physical register P8.

The next instruction which is seen which manipulates (i.e. grows or shrinks) the stack may, for example, be another instruction which shrinks the stack (as seen in block 106), as indicated by the dotted arrow from block 112 to block 106 in FIG. 1. In this example, this second instruction which shrinks the stack may be:

ADD P7 P8 16

This size value (16) in this instruction is compared (in block 108) to the size value in the top entry in the data structure and it can be seen from this example that there is a correspondence ('Yes' in block 108 as 16/4=4 and 4=4). Consequently the mapping of the physical register storing the stack pointer is updated (in block 110) to the register ID in the top entry in the data structure (P2) and the top entry is removed from the data structure (in block 112) leaving an empty data structure.

As shown in the fourth example stack 304 in FIG. 3, four data items are removed from the stack (as indicated by arrow 34) and the stack pointer is updated from the value corresponding to arrow 308 as stored in physical register P8 to the value corresponding to arrow 306 which was stored earlier in physical register P2.

This example, in which there are multiple instructions growing the stack followed by multiple instructions shrinking the stack may, for example, correspond to nested functions, for example where, in the sequence of instructions:

SUB P8 P2 16
SUB P4 P8 8
ADD P3 P4 8
ADD P7 P8 16 the outer pair of instructions correspond to a first function and the inner pair of instructions correspond to a second function which is nested inside the first function.

Where there are many nested functions within other functions, the methods described herein are still applicable; however, they may require a larger value of N (i.e. a greater depth of the data structure) so that more entries can be stored without running out of space. In the example described above, the value of N needed to equal or exceed 2 in order that the data structure did not overflow.

In examples where function calls are nested sufficiently deeply to overflow the prediction stack (e.g. N is too small for the degree of nesting used), then the oldest information in the prediction stack will be lost (and their counterparts will not be predicted); however the most recent information will survive and the predictions which are made will continue to be correct.

Figure 4:
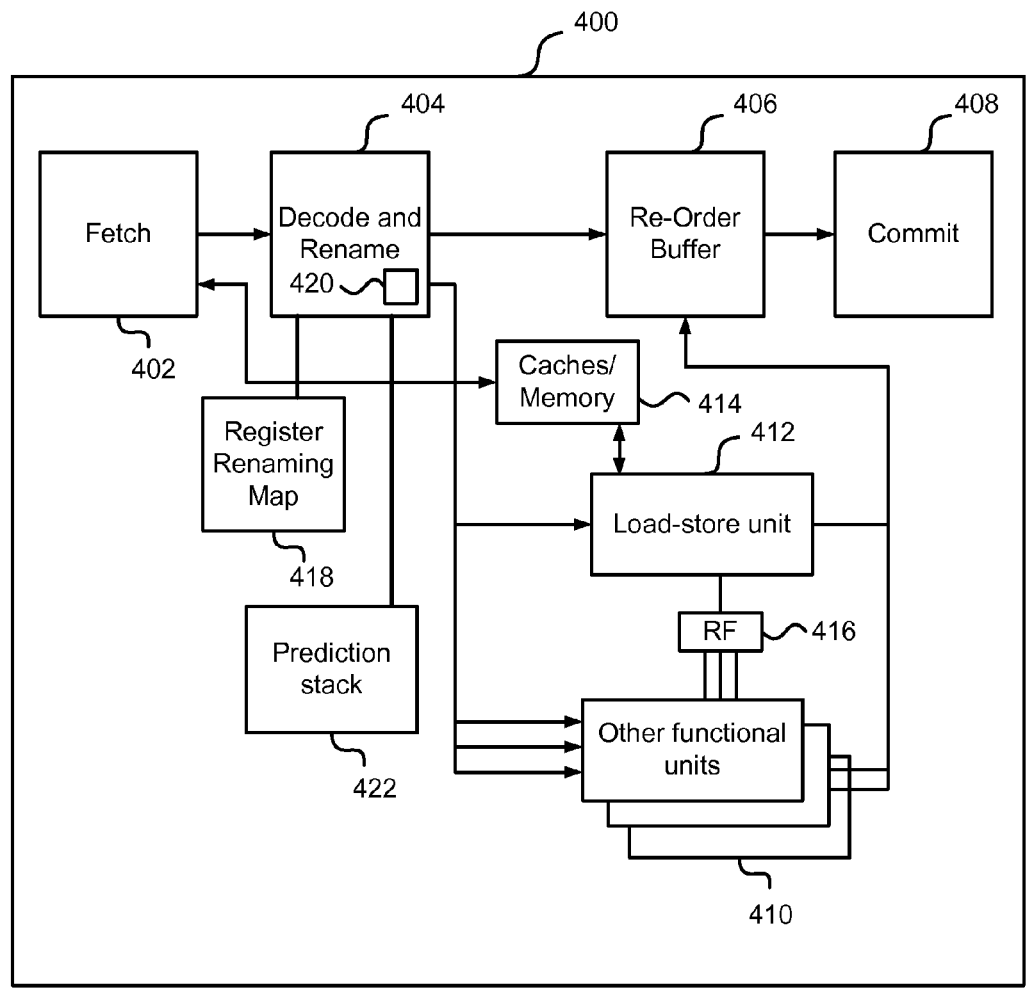
FIG. 4 shows a schematic diagram of an example processor.

FIG. 4 shows a schematic diagram of an example out-of-order processor 400 in which the methods described herein may be implemented. In this example the processor 400 is a single-threaded processor, however the methods are also applicable to multi-threaded processors (where each thread would maintain a separate stack using separate stack pointers).

The processor 400 comprises a fetch stage 402, a decode and rename stage 404, a re-order buffer 406, a commit stage 408, one or more functional units 410, 412 which each comprise one or more execution pipelines and caches/memory 414. The processor 400 further comprises a register file (RF) 416 and a register renaming map 418 which is maintained by the decode and rename stage 404 (or by a register renaming module within the decode and rename stage 404).

The fetch stage 402 is configured to fetch instructions from a program (in program order) as indicated by a program counter (PC). Once an instruction is fetched it is provided to the decode and rename stage 404 which is arranged to interpret the instructions and perform register renaming. In particular, each instruction may comprise a register write operation; one or more register read operations; and/or an arithmetic or logical operation. A register write operation writes to a destination register and a register read operation reads from a source register. During register renaming each architectural register referred to in an instruction (e.g. each source and destination register) is replaced (or renamed) with a physical register.

For register write operations the architectural register (e.g. destination register) referred to is allocated an unused (or available) physical register. Any allocation may be stored in the register renaming table 418, where the register renaming table 418 is a data structure showing the mapping between each architectural register and the physical register allocated to that instruction in the program flow. For register read operations the correct physical register for a particular architectural register (e.g. source register) can be determined from an entry in the register renaming table 418 indexed by the architectural register.

The methods described above with reference to FIGS. 1-3 may be implemented within the decode and rename stage 404 and in an example, the decode and rename stage 404 may comprise a stack pointer value prediction module 420 which performs the method shown in FIG. 3 and described above. As described above, this module 420 (or the decode and rename stage 404) maintains a data structure referred to herein as the prediction stack 422.

After an instruction passes through the decode and rename stage 404 it is inserted into a reorder buffer 406 (ROB) and dispatched to a functional unit 410, 412 for execution. The functional unit 410, 412 that the instruction is dispatched to may be based on the type of instruction. The re-order buffer 406 is a buffer that enables the instructions to be executed out-of-order, but committed in-order. The re-order buffer 406 holds the instructions that are inserted into it in program order, but the instructions within the ROB 406 can be executed out of sequence by the functional units 410, 412. In some examples, the re-order buffer 406 can be formed as a circular buffer having a head pointing to the oldest instruction in the ROB 406, and a tail pointing to the youngest instruction in the ROB 406. Instructions are output from the re-order buffer 406 to the commit stage 408 in program order. In other words, an instruction is output from the head of the ROB 406 when that instruction has been executed, and the head is incremented to the next instruction in the ROB 406. Instructions output from the re-order buffer 406 are provided to a commit stage 408, which commits the results of the instructions to the register/memory.

Each functional unit 410, 412 is responsible for executing instructions and may be configured to execute specific types of instructions. For example a load-store unit 412 is shown in FIG. 4 and the other functional units 410 may comprise one or more of an integer unit, a floating point unit (FPU), a digital signal processing (DSP)/single instruction multiple data (SIMD) unit, or a multiply accumulate (MAC) unit. The load-store unit 412 reads data to and writes data from the L1 cache and memory beyond that. In some instances, the load-store unit may calculate addresses and it may (or may not) contain the L1 cache and perform the data/tag RAM look-ups. An integer unit performs integer instructions, an FPU executes floating point instructions, a DSP/SIMD unit has multiple processing elements that perform the same operation on multiple data points simultaneously, and a MAC unit computes the product of two numbers and adds that product to an accumulator. The pipelines within the functional units may have different lengths and/or complexities. For example, a FPU pipeline is typically longer than an integer execution pipeline because it is generally performing more complicated operations.

While executing the instructions received from the decode and rename stage 404, each functional unit 410, 412 performs reads and writes to physical registers in one or more shared register files 416.

The processor 400 may also comprise functional elements other than those shown in FIG. 4. For example, the processor may further comprise a branch predictor which is configured to predict which direction the program flow will take in the case of instructions known to cause possible flow changes, such as branch instructions. Branch prediction is useful as it enables instructions to be speculatively executed by the processor 400 before the outcome of the branch instruction is known. When the branch predictor predicts the program flow accurately, this improves performance of the processor 400. However, if the branch predictor does not correctly predict the branch direction, then a misprediction occurs which needs to be corrected before the program can continue. To correct a misprediction, the speculative instructions sent to the ROB 406 are abandoned, and the fetch stage 402 starts fetching instructions from the correct program branch.

It will be appreciated that other processors may not comprise all the functional elements shown in FIG. 4 (i.e. one or more of the functional elements shown in FIG. 4 may be omitted) and may, in some examples, comprise additional functional elements not shown in FIG. 4.

In addition to the prediction stack 422 which is maintained by the decode and rename stage 404, in some examples there may be a further new data structure maintained by the load-store unit 412. This new data structure, which may be referred to herein as the stack pointer cache, stores stack pointer physical register IDs along with the actual stack pointer value (as stored in the corresponding physical register). In various examples, the stack pointer cache stores the last M stack pointer physical register IDs along with the corresponding stack pointer values and in some examples M=N.

Figure 5:
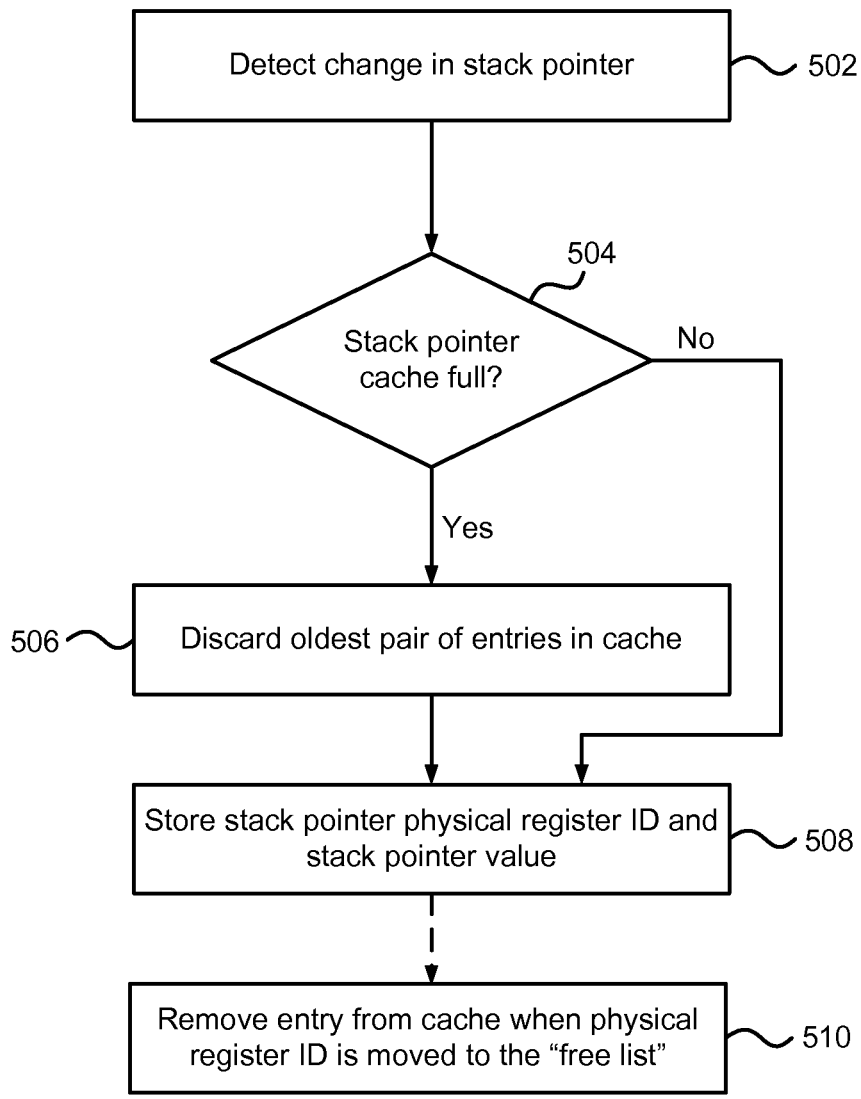
FIG. 5 is a flow diagram of an example method of stack pointer value caching implemented by a load-store unit.

FIG. 5 is a flow diagram of an example method of stack pointer value caching implemented by the load-store unit 412 which may be used in combination with the method shown in FIG. 1 which is implemented by the decode and rename stage 404 or which may be used independently of the method shown in FIG. 1. As shown in FIG. 5, when a change in stack pointer is detected (block 502), for example, by the decode and rename stage 404 which notifies the load-store unit 412, the current stack pointer physical register ID is stored along with the value of the stack pointer in the stack pointer cache (block 508). It will be appreciated that this may be implemented in a number of different ways, for example, the new physical register ID and value may be stored immediately following a change in the stack pointer or alternatively the old physical register ID and value may be stored immediately preceding a change. In various examples, storing the physical register ID may use 6 bits of memory and the value of the stack pointer may use 32 bits.

Where the size of the stack pointer cache is limited it may be arranged to store M data pairs (where the pair comprises a physical register ID and a stack pointer value). Where the size is limited, storing a new data pair may require the oldest stored pair of values to be discarded (block 506) in the event that there is no space to store the new value ('Yes' in block 504).

When a physical register ID is moved to the "free register list" (e.g. in the decode and rename stage 404), corresponding entries in the stack pointer cache are removed (block 510).

By storing the physical register IDs and values, the load-store unit already knows the value of the stack pointer when it receives an instruction to load/store using the corresponding physical register in the address and this eliminates the need to perform a register file read (which requires a register file read port). By caching the value of the stack pointer, it is possible to calculate addresses (often stack pointer plus immediate offset) without requiring a read port. This means that a limited ALU can be used for these calculations, and this frees up other functional units for other operations.

The method of FIG. 5 can be extended by adding a new column into the stack pointer cache to hold an offset value. This offset would be the offset from the stack pointer (as variables stored in memory are stored at a fixed offset from the stack pointer). In this situation, if an address for a load/store was the value of the stack pointer plus an offset (e.g. 'LD P20 [P2+8]') then the physical register and offset can be used to look up and detect if the full 32 bit address is cached in the stack pointer cache.

In the examples described above, the comparison (in block 108 of FIG. 1) compares the size value in the instruction (seen in block 106) to the top entry in the prediction stack. In other examples however, the comparison may involve more than one entry in the prediction stack. For example, if two successive instructions manipulating the stack are both adding data to the stack:
SUB P8 P2 16
SUB P9 P8 8
This results in two entries being stored in the prediction stack:

| P2 | 4 |
| P8 | 2 |
|    |   |
|    |   |

If subsequently an instruction shrinking the stack is seen (in block 106):
ADD P7 P9 24
a comparison with the top entry in the prediction stack (in block 108) would not result in a correspondence being found (6≠2); however a comparison with the top two entries would result in a correspondence (6=4+2) and so, the comparison operation (in block 108) may involve looking at more than one entry as shown in FIG. 6.

Figure 6:
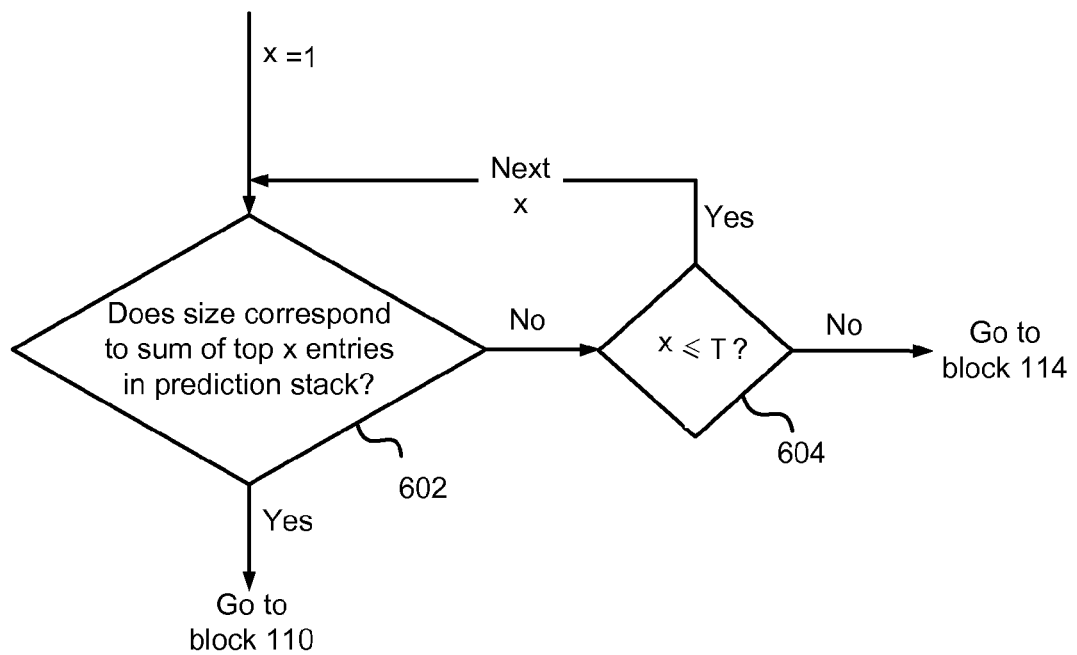
FIG. 6 is a flow diagram showing an operation from the method of FIG. 1 in more detail.

FIG. 6 is a flow diagram of an example method of implementing the comparison operation (block 108 in FIG. 1) in which there is a threshold T of the number of entries that may be used in the size comparison. If the size in the instruction shrinking the stack (seen in block 106) is only to be compared against the top entry in the prediction stack, T=1; however, if the comparison can involve more than one entry in the prediction stack, T>1. As shown in FIG. 6, the comparison starts with a variable x=1 and compares the size in the shrinking instruction (from block 106) to the top entry in the prediction stack (in a first iteration of block 602). For T=1, the method proceeds as described above and if there is no correspondence, all entries in the prediction stack are flushed (in block 114). If however, T>1, then there are one or more further iterations of the comparison in which the size in the shrinking instruction (from block 106) is compared to the sum of sizes from increasing numbers of entries in the prediction stack (increasing by one entry in each iteration) until either there is a correspondence (when the method proceeds to block 110 in FIG. 1), the threshold is reached without a correspondence being found (when the method proceeds to block 114 in FIG. 1) or all the entries in the prediction stack have been used without a correspondence being found (when the method again proceeds to block 114 in FIG. 1).

Where multiple entries in the prediction table as used in the comparison operation (in block 108), e.g. as shown in FIG. 6, the mapping of the stack pointer is updated (in block 110) using the least recently added (i.e. the oldest) of all the entries used in the comparison operation (i.e. the oldest of the x entries which were used to achieve a correspondence) and all entries used in achieving the correspondence (i.e. all x entries which result in a 'Yes' in block 602) are removed from the prediction stack (in block 112).

Figure 7:
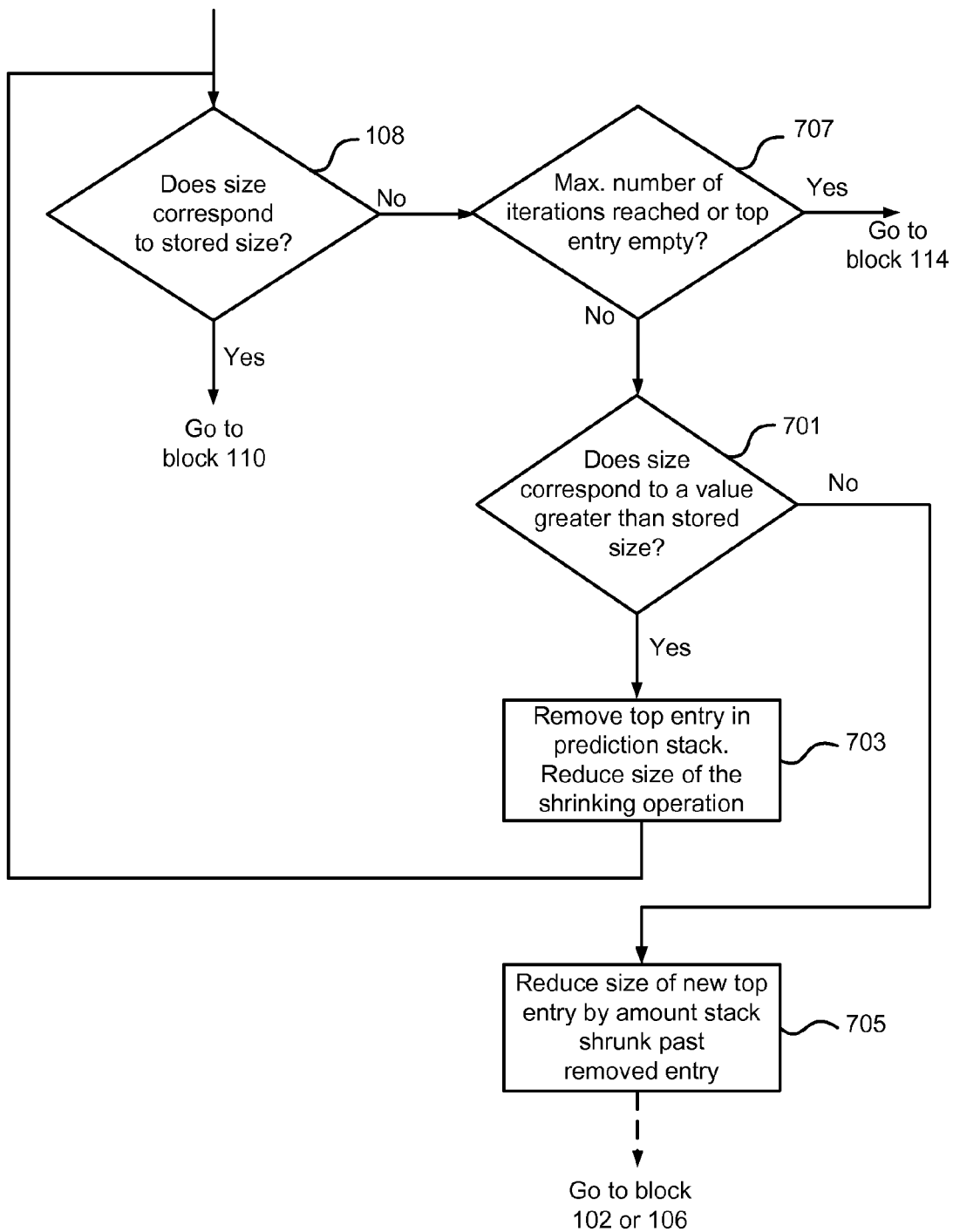
FIG. 7 is a flow diagram showing an operation from the method of FIG. 1 in more detail.

The method can also be updated to handle cases where an instruction shrinking the stack does not completely undo the operation of a set number of entries in the prediction stack, as shown in FIG. 7. FIG. 7 is an iterative method and a maximum number of iterations may be specified. For example, if two successive instructions manipulating the stack are both adding data to the stack:

SUB P8 P2 16
SUB P9 P8 8

This results in two entries being stored in the prediction stack:

| P2 | 4 |
|----|---|
| P8 | 2 |
|    |   |
|    |   |

If subsequently an instruction shrinking the stack is seen (in block 106):

ADD P7 P9 12

A comparison to the top entry would not result in a correspondence being found ('No' in block 108, as 12/4=3 and 3≠2) but (assuming that the maximum number of iterations has not been met, 'No' in block 707) as the size corresponds to a value greater than the stored size ('Yes' in block 701, as 3>2) the top entry in the prediction stack is removed (block 703), and the size of the shrinking operation is reduced by 2 (i.e. by the size of the entry just removed) to give a shrinking size of 1 in this example.

In a second iteration of the method (assuming again that the maximum number of iterations has not been met and there are still more entries in the prediction stack, 'No' in block 707), another comparison is performed (in block 701) between the size of the shrinking operation (as reduced in block 703 of the previous iteration, 1 in this example) and the stored size (4 in this example). As, in this example, the updated size of the shrinking instruction is smaller than the stored size ('No' in block 701, as 1<4), the shrinking instruction will be allowed to execute as normal (such that in this particular example, the new stack pointer is calculated and stored in P7) and the size in the new top entry will be reduced by the size of the shrinking instruction (block 705, e.g. a shrinking by 1 in this example as the removed entry contained the value 2 and 3−2=1) to give an entry size of 3. This results in one entry being left in the prediction stack:

| P2 | 3 |
|----|---|
|    |   |
|    |   |
|    |   |

If subsequently an instruction shrinking the stack is seen (in block 106):

ADD P6 P7 12

A comparison with the top entry would now result in a correspondence being found (as 12/4=3 and 3=3). Consequently the mapping of the physical register storing the stack pointer is updated (in block 110) to the register ID in the top entry in the data structure (P2) and the top entry is removed from the data structure (in block 112) leaving an empty data structure. The instruction shrinking the stack would not need to be executed.

Figure 8:
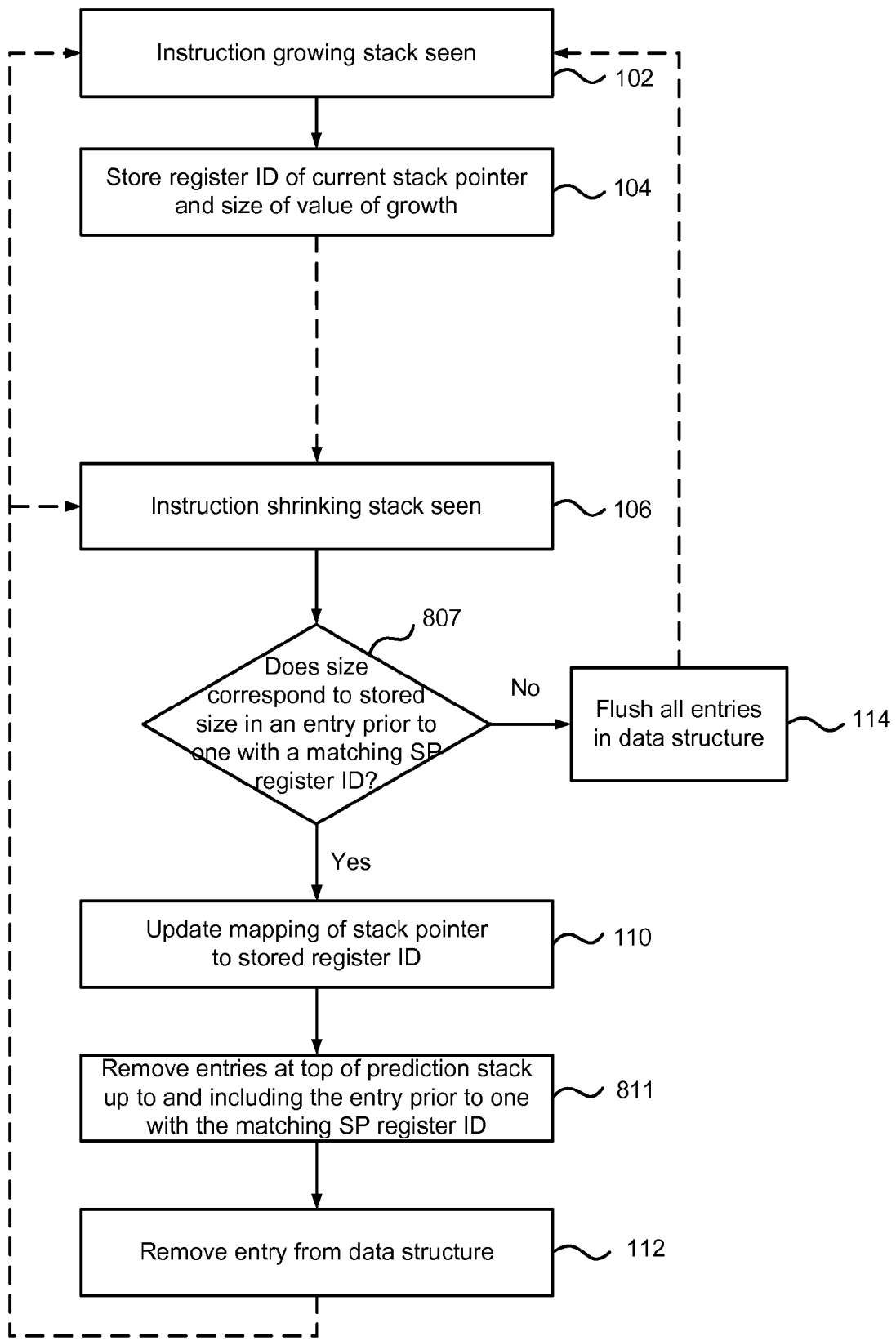
FIG. 8 is a flow diagram of another example method of stack pointer value prediction.
Figure 9:
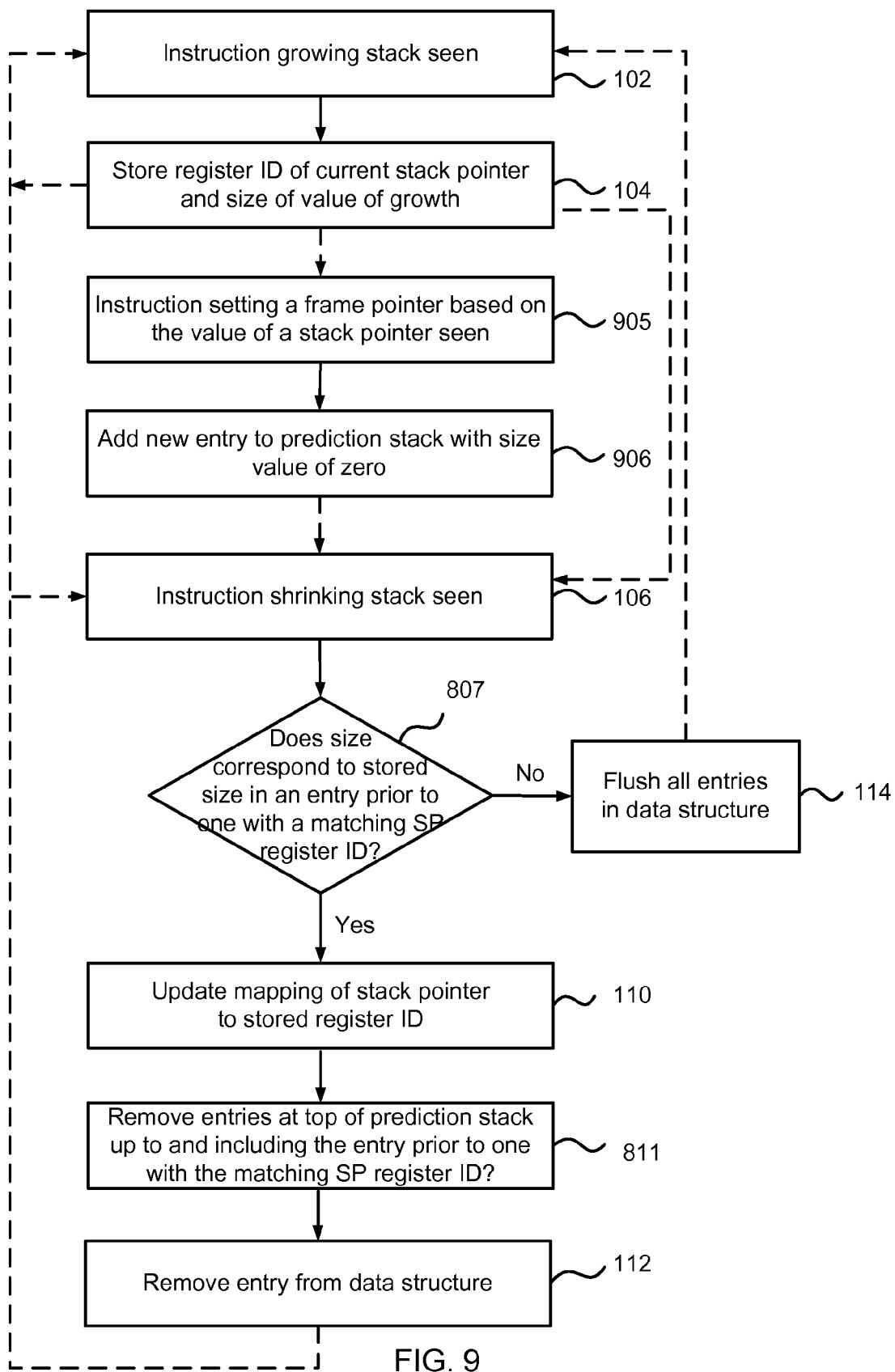
FIG. 9 is a flow diagram of a further example method of stack pointer value prediction.

In scenarios where processors dynamically allocate memory, there may be data added to the stack (resulting in a change in the stack pointer) as a result of the dynamic allocation, as well as data added to the stack as a result of a function call (as described above) and consequently the method described above with reference to FIG. 1 may be modified and two variations are shown in FIGS. 8 and 9.

In the first example variation, shown in FIG. 8, entries may still be stored in the prediction stack which are the result of the dynamic allocation of memory (rather than a function call) are flagged in the prediction stack (in block 104). An example of such an instruction (e.g. as seen in block 102) would be SUB SP SP R5, rather than SUB SP SP 8.

In an example, if there are two instructions adding data to the stack which are the result of function calls, followed by one or more instructions adding data to the stack which are the result of dynamic allocation of memory, the prediction stack may look like:

| P2 | 4 |
|----|---|
| P8 | 4 |
| P9 | 0 |
|    |   |
|    |   |

In this example, only the first in a sequence of instructions which add data to the stack and are the result of dynamic allocation of memory are stored in the prediction stack (in block 104).

If an instruction shrinking the stack is subsequently seen (in block 106), such as:

ADD P7 P9 16 the comparison of sizes (in block 807) looks to an entry prior to one which has the same stack pointer register ID as identified in the instruction (e.g. P9 in this example). In this example, there is a correspondence ('Yes' in block 807, as the entry prior to the one comprising P9 is P8, 4, 16/4=4 and 4=4) and consequently, the mapping of the stack pointer is updated to register ID P8 (in block 110). All the entries at the top of the prediction stack up to and including the entry prior to one which has the same stack pointer register ID as identified in the instruction (e.g. P8, 4 in the example above) are then removed (block 811). In the example above, the prediction stack would then only contain a single entry:

| P2 | 4 |
|----|---|
|    |   |
|    |   |
|    |   |

The second example variation, shown in FIG. 9, involves the detection of instructions relating to a frame pointer (which indicates that memory allocation is being performed dynamically). Where memory is allocated dynamically, both a stack pointer and a frame pointer may be used. Unlike a stack pointer which changes in value when data is added to or removed from the stack (and so may change while the function is running in situations where memory is allocated dynamically), the frame pointer may be used to point to a fixed position in the stack (for the period while a function is running, if the stack pointer is required for dynamic memory allocation). This fixed position may, for example, be the position the stack pointer would be pointing at if no dynamic allocation was used within the function (i.e. the memory location after the last statically allocated section of memory).

As shown in FIG. 9, in this second example variation, entries are added to the prediction stack in the same way as described above with reference to FIG. 1 (in blocks 102 and 104); however, if an instruction setting a frame pointer based on the value of a stack pointer is seen (block 905), e.g.:

MOV FP SP which could update the rename map entry for FP with the physical register assigned to SP (P9 in this example), then a new entry in the prediction stack is added (block 906). In an example, the prediction stack prior to the detection of the instruction relating to a frame pointer may comprise:

| P2 | 4 |
|----|---|
| P8 | 4 |
|    |   |
|    |   |
|    |   |

Following detection of the instruction setting a frame pointer based on the value of a stack pointer (in block 905) the prediction stack may comprise:

| P2 | 4 |
|----|---|
| P8 | 4 |
| P9 | 0 |
|    |   |
|    |   | where the top entry in the prediction stack comprises the current physical register assigned to the stack pointer (P9 in this example) and a size value of zero (as the stack has not grown). The instruction MOV FP SP may be considered to be an indication that there will be a dynamic allocation soon (rather than trying to detect the dynamic allocation itself).

The method then proceeds in a similar manner to that described with reference to FIG. 8. For example, if there are a number of subsequent instructions that grow the stack, the prediction stack may comprise:

| P2  | 4 |
|-----|---|
| P8  | 4 |
| P9  | 0 |
| P10 | 4 |
| P11 | 4 |

The latest entries in the prediction stack may be from static allocations from within a nested function. These may be removed in the normal way leaving the following prediction stack:

| P2 | 4 |
|----|---|
| P8 | 4 |
| P9 | 0 |
|    |   |
|    |   |

At this point if a shrinking instruction is seen shrinking the stack from the value in P9 by 4, e.g.:

ADD P12 P9, 16

Then the stack pointer can be remapped to P8 (as P9 was the SP after doing SUB P9 P8 16), the instruction may be dropped, and the latest 2 entries may be removed from the prediction stack (in block 811) to leave just one entry.

It will be appreciated that although the description of FIGS. 8-9 only refers to comparison with single entries in the prediction stack, these variations may be combined with the variations described with reference to FIGS. 6-7, e.g. such that the size in an instruction shrinking the stack (as seen in block 106) may be compared with more than one entry in the prediction stack (in block 108 or 807).

In a further variation of FIGS. 8 and 9, flags may be used (in each entry in the prediction stack) to indicate whether instructions were added as a result of a function calls. In such an example, block 811 is modified such that all flagged entries at the top of the prediction stack are removed.

Figure 10:
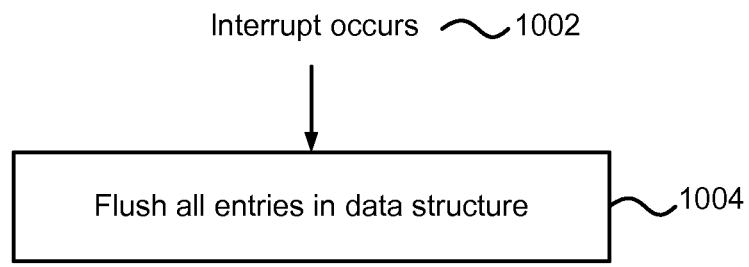
FIG. 10 is a flow diagram showing a method implemented when an interrupt occurs.

FIG. 10 is a flow diagram of a method which is used when an interrupt is detected (block 1002) and this method may be used in combination with any of the methods described previously. When an interrupt occurs, the stack pointer is stored into memory and then restored on exit of the interrupt. As the interrupt may have manipulated the value of the stack pointer, the entries stored in the prediction stack may no longer be valid and so the prediction stack is flushed to remove all entries (block 1004). This can be extended to include the detection of any situation where the stack pointer value is loaded from memory.

Figure 11:
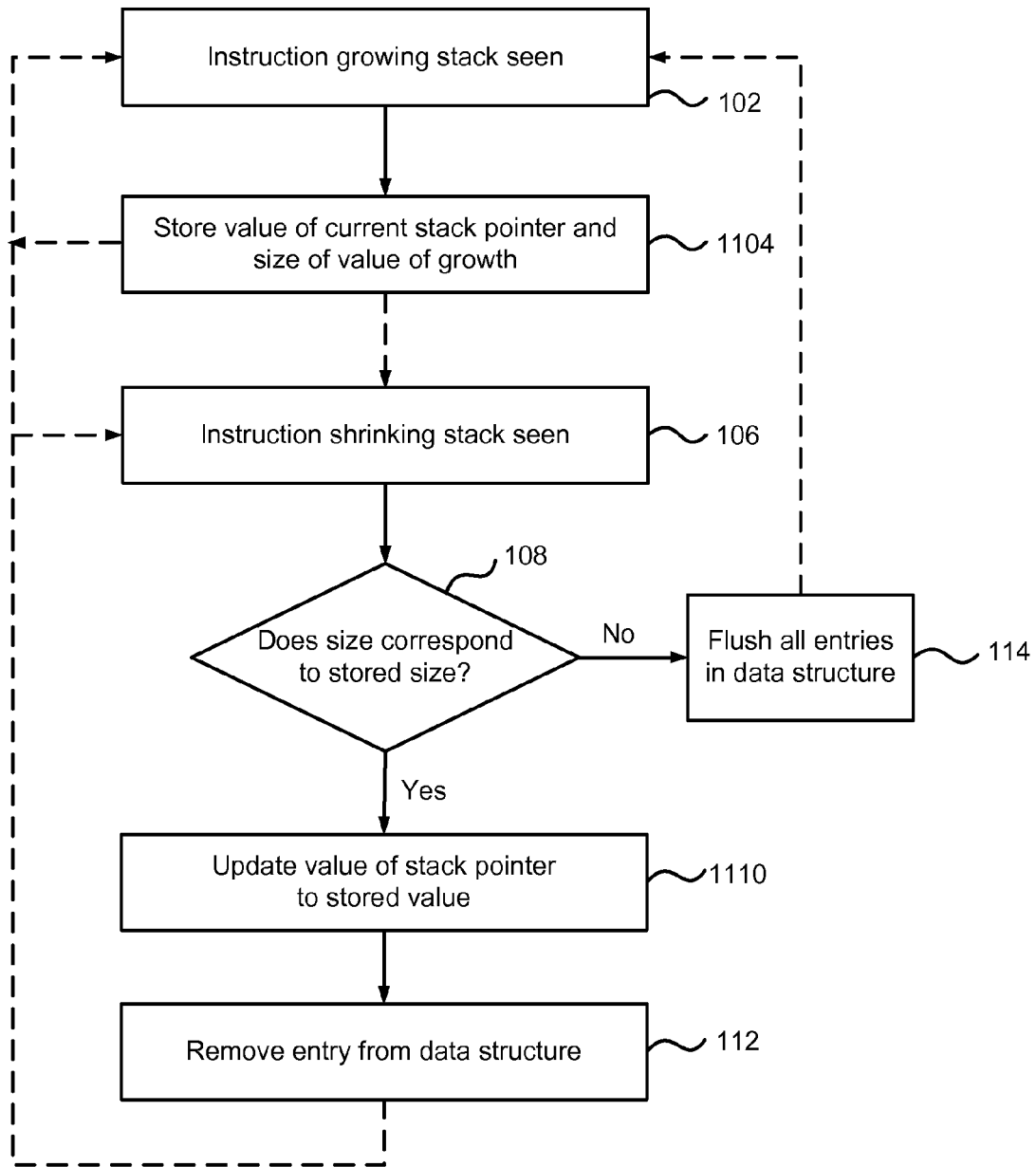
FIG. 11 is a flow diagram of a yet further example method of stack pointer value prediction.

The methods are described above in relation to a processor which uses register renaming. The methods are also applicable where register renaming is not used; however in such applications the prediction stack stores the current stack pointer value (prior to the growing of the stack) along with a size value of the growth of the stack (in block 1104), as shown in FIG. 11. This is less efficient than using the register ID because the stack pointer requires more storage (e.g. it may be a 32-bit value). The method then proceeds as shown in FIG. 1 and described above, except that instead of updating the mapping of the stack pointer (in block 110) if there is a correspondence between the size in the shrinking instruction (seen in block 106) and a stored entry (or entries) in the prediction stack ('Yes' in block 108), the stack pointer is itself updated to the stored value (block 1110). It will be appreciated that the variations described above with reference to FIG. 1 (e.g. as shown in FIGS. 6-9) are also applicable to the method shown in FIG. 11.

In the examples above the data structure which stores the stack pointer register ID and size values of the growth of the stack (the prediction stack) is described as a FILO. It will be appreciated, however, that it may alternatively be implemented using a cache structure.

Although the methods described above relate to prediction of the stack pointer value, the techniques described may also be used to detect any instruction which is predicted to be reversible and if the reverse of this instruction is seen subsequently, the old physical register can be used. In such examples, the data structure used may use a cache structure rather than a FILO to store data on all functions which might be reversible. As data (e.g. physical register ID and constant value, although there may be other fields depending on the particular operation) is stored for each operation which might be reversible, rather than only instructions which are subsequently reversed, it is necessary to look at stored data which is not the most recently stored entry in the data structure.

The methods described herein may be used with programming languages with calling conventions similar to C (which covers most languages) that use a stack in memory for storage within that part of the program scope. The methods may be modified for use with other languages.

The term 'processor' and 'computer' are used herein to refer to any device, or portion thereof, with processing capability such that it can execute instructions. The term 'processor' may, for example, include central processing units (CPUs), graphics processing units (GPUs or VPUs), physics processing units (PPUs), digital signal processors (DSPs), general purpose processors (e.g. a general purpose GPU), microprocessors, any processing unit which is designed to accelerate tasks outside of a CPU, etc. Those skilled in the art will realize that such processing capabilities are incorporated into many different devices and therefore the term 'computer' includes set top boxes, media players, digital radios, PCs, servers, mobile telephones, personal digital assistants and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of predicting stack pointer values for a stack in a processor, the stack having an associated stack pointer, the method comprising:
   in response to detection of an instruction growing the stack, storing a data entry in a data structure different from the stack using at least one processor, the data entry comprising a size value corresponding to an amount by which the instruction grows the stack and at least one of:
   a register ID of a physical register storing a value of the stack pointer prior to the instruction growing the stack; and
   the value of the stack pointer prior to the instruction growing the stack; and
   in response to subsequent detection of an instruction shrinking the stack, comparing a size value corresponding to an amount by which the instruction shrinks the stack to the stored size value in the data structure;
   in response to detecting a correspondence between the size value corresponding to an amount by which the instruction shrinks the stack and the stored size value in the data structure,
   updating the stack pointer based on at least one of the register ID and the value of the stack pointer in the data entry comprising the stored size value used in the comparison and removing from the data structure the data entry comprising the stored size value used in the comparison; and
   in response to failing to detect a correspondence between the size value corresponding to an amount by which the instruction shrinks the stack and the stored size value, removing the data entry from the data structure.

2. A method according to claim 1, wherein the stored data entry comprises a size value corresponding to an amount by which an instruction grows the stack and a register ID of a physical register storing a value of the stack pointer prior to the instruction growing the stack.

3. A method according to claim 1, wherein the stored data entry comprises a size value corresponding to an amount by which an instruction grows the stack and a value of the stack pointer prior to the instruction growing the stack.

4. A method according to claim 1, wherein comparing a size value corresponding to an amount by which the instruction shrinks the stack to stored size value in the data structure comprises:
   comparing a size value corresponding to an amount by which the instruction shrinks the stack to a size value in a single most recent entry the data structure.

5. A method according to claim 1, wherein comparing a size value corresponding to an amount by which the instruction shrinks the stack to the stored size value in the data structure comprises:
   comparing a size value corresponding to an amount by which the instruction shrinks the stack to a stored size value in an entry in the data structure prior to an entry including a register ID of the current stack pointer.

6. A method according to claim 5, further comprising:
   in response to detecting an instruction setting a frame pointer based on the value of a stack pointer, adding a new data entry to the data structure with a size value of zero.

7. A method according to claim 5, further comprising:
   removing from the data structure all most recent data entries up to an including the entry including the register ID of the current stack pointer.

8. A method according to claim 1, wherein comparing a size value corresponding to an amount by which the instruction shrinks the stack to the stored size value in the data structure comprises:
   comparing a size value corresponding to an amount by which the instruction shrinks the stack to a size value in x most recent entries the data structure, where x=1; and
   in response to detecting no correspondence between the size value corresponding to an amount by which the instruction shrinks the stack and the size value in x most recent entries in the data structure, repeating the comparison with a value of x increased by 1 until a correspondence is detected or x exceeds a predefined threshold.

9. A method according to claim 1, wherein comparing a size value corresponding to an amount by which the instruction shrinks the stack to the stored size value in the data structure comprises:
   (i) comparing a size value corresponding to an amount by which the instruction shrinks the stack to a size value in a single most recent entry the data structure;
   (ii) in response to detecting no correspondence between the size value corresponding to an amount by which the instruction shrinks the stack and the size value in the most recent entry the data structure, determining whether a maximum number of iterations has been reached or a top entry in the data structure is empty;
   (iii) in response to determining that a maximum number of iterations has not been reached and a top entry in the data structure is not empty, determining whether the size value corresponding to an amount by which the instruction shrinks the stack is greater than the size value in the most recent entry in the data structure;
   (iv) in response to determining that the size value corresponding to an amount by which the instruction shrinks the stack is greater than the size value in the most recent entry in the data structure, removing the most recent entry from the data structure and reducing the size value corresponding to an amount by which the instruction shrinks the stack by the size value in the removed entry from the data structure and returning to block (i) in a further iteration; and
   (v) in response to determining that the size value corresponding to an amount by which the instruction shrinks the stack is not greater than the size value in the most recent entry in the data structure, reducing a size value in a next most recent entry in the data structure by a difference between the amount by which the instruction shrinks the stack and the size value in the removed most recent entry.

10. A method according to claim 1, further comprising, in a load-store unit in the processor:
    detecting a change in a stack pointer; and
    in response to detecting a change in the stack pointer, storing a register ID of a physical register storing a value of the stack pointer prior to the change and the value of the stack pointer prior to the change.

11. A method according to claim 1, further comprising in response to detecting an interrupt, removing any entries from the data structure.

12. A processor comprising:
    memory arranged to store a stack, the stack having an associated stack pointer; a stack pointer value prediction module; and memory arranged to store a data structure different from the stack, wherein the stack pointer value prediction module is arranged:

in response to detection of an instruction growing the stack, to store, in the data structure, a data entry comprising a size value corresponding to an amount by which the instruction grows the stack and at least one of:

a register ID of a physical register storing a value of the stack pointer prior to the instruction growing the stack; and the value of the stack pointer prior to the instruction growing the stack; and in response to subsequent detection of an instruction shrinking the stack, to compare a size value corresponding to an amount by which the instruction shrinks the stack to stored size value in the data structure;

in response to detecting a correspondence between the size value corresponding to an amount by which the instruction shrinks the stack and the stored size value in the data structure, to update the stack pointer based on at least one of the register ID and the value of the stack pointer in the data entry comprising the stored size value used in the comparison and removing from the data structure the data entry comprising the stored size value used in the comparison; and in response to failing to detect a correspondence between the size value corresponding to an amount by which the instruction shrinks the stack and the stored size value, to remove the data entry from the data structure.

13. A processor according to claim 12, wherein the stored data entry in the data structure comprises a size value corresponding to an amount by which an instruction grows the stack and a register ID of a physical register storing a value of the stack pointer prior to the instruction growing the stack.

14. A processor according to claim 12, wherein the stored data entry in the data structure comprises a size value corresponding to an amount by which an instruction grows the stack and a value of the stack pointer prior to the instruction growing the stack.

15. A processor according to claim 12, wherein comparing a size value corresponding to an amount by which the instruction shrinks the stack to stored size value in the data structure comprises:

comparing a size value corresponding to an amount by which the instruction shrinks the stack to a size value in a single most recent entry the data structure.

16. A processor according to claim 12, wherein comparing a size value corresponding to an amount by which the instruction shrinks the stack to the stored size value in the data structure comprises:

comparing a size value corresponding to an amount by which the instruction shrinks the stack to a stored size value in an entry in the data structure prior to an entry including a register ID of the current stack pointer.

17. A processor according to claim 16, wherein the stack pointer value prediction module is further arranged, in response to detecting an instruction setting a frame pointer based on the value of a stack pointer, to add a new data entry to the data structure with a size value of zero.

18. A processor according to claim 16, wherein the stack pointer value prediction module is further arranged to remove from the data structure all most recent data entries up to an including the entry including the register ID of the current stack pointer.

19. A processor according to claim 12, wherein the processor is an out-of-order processor.

20. A method of predicting stack pointer values for a stack in a processor, the stack having an associated stack pointer and the method comprising, in a load-store unit in the processor:

detecting a change in a stack pointer;

in response to detecting a change in the stack pointer, storing a register ID of a physical register storing a value of the stack pointer prior to the change and the value of the stack pointer prior to the change; and in response to receiving an instruction to load/store using a physical register corresponding to a stored register ID, calculating an address for the load/store using the stored value of the stack pointer associated with the stored register ID.

\* \* \* \* \*